United States Patent
Boydston

[15] 3,664,289
[45] May 23, 1972

[54] HYDRAULIC JUMP CAPTURED AIR BUBBLE VESSEL

[72] Inventor: Edward A. Boydston, 546 A Flordia Street, Vallejo, Calif. 94590

[22] Filed: Oct. 28, 1970

[21] Appl. No.: 84,601

Related U.S. Application Data

[63] Continuation-in-part of Ser. No. 870,301, Dec. 22, 1969, abandoned.

[52] U.S. Cl. .......................................................... 114/67 A
[51] Int. Cl. .............................................................. B63b 1/38
[58] Field of Search ................................... 114/67 A, 66.5 H

[56] References Cited

UNITED STATES PATENTS

| | | | |
|---|---|---|---|
| 1,656,411 | 1/1928 | Baldwin | 114/67 A |
| 2,993,462 | 7/1961 | Gough | 114/67 A |
| 3,342,032 | 9/1967 | Cox et al. | 114/67 A |

*Primary Examiner*—Andrew H. Farrell
*Attorney*—Owen, Wickersham & Erickson

[57] ABSTRACT

A water-borne air cushion vessel has an underwater driving means on its forward end which creates a hydraulic wave at a distance rearwardly therefrom. The wave produced provides at its crest a constant seal for the forward side of a cavity under the vessel wherein air is trapped to produce the cushioning effect that maintains the vessel above the nominal water level.

5 Claims, 6 Drawing Figures

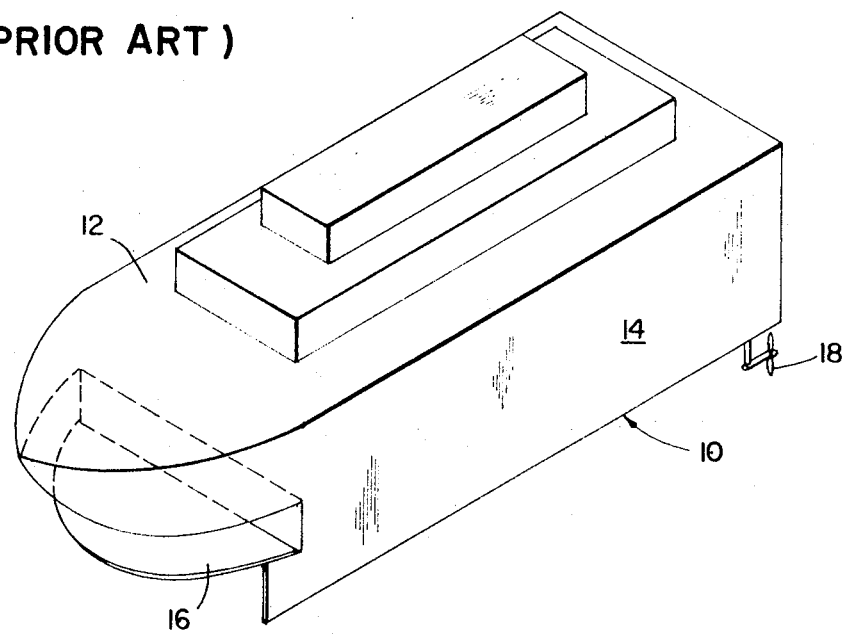
FIG_1
(PRIOR ART)
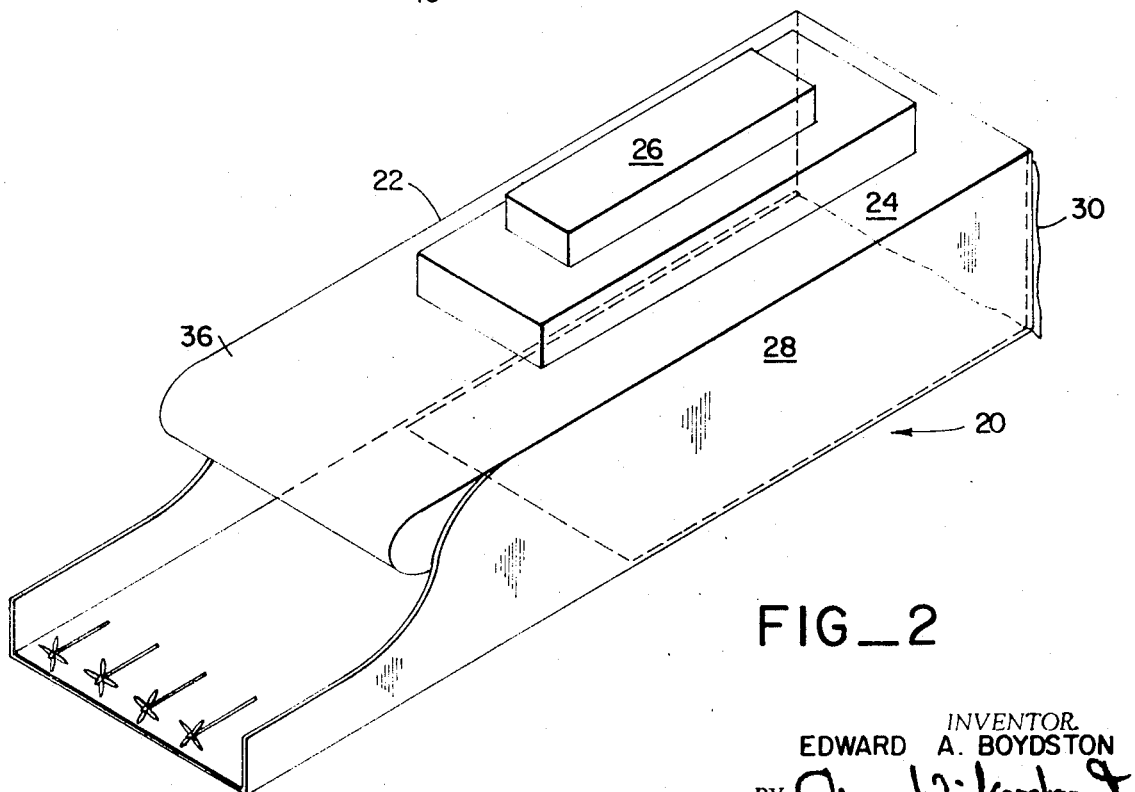
FIG_2
INVENTOR
EDWARD A. BOYDSTON
BY Owen Wickersham & Erickson.
ATTORNEYS

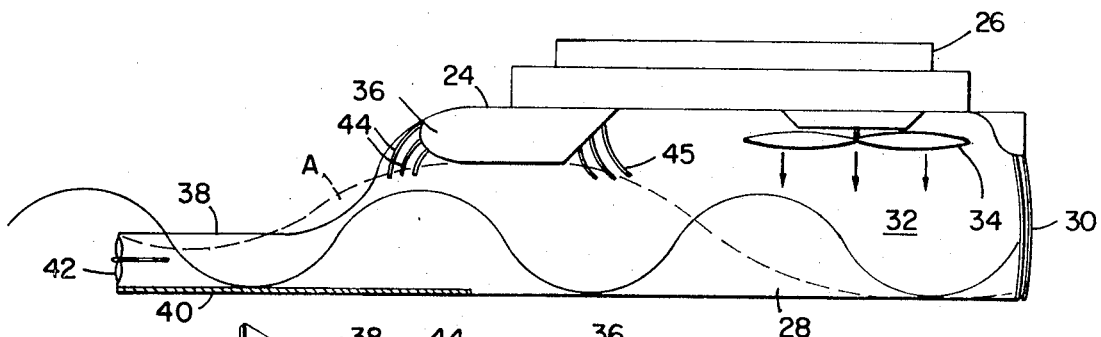
FIG_3
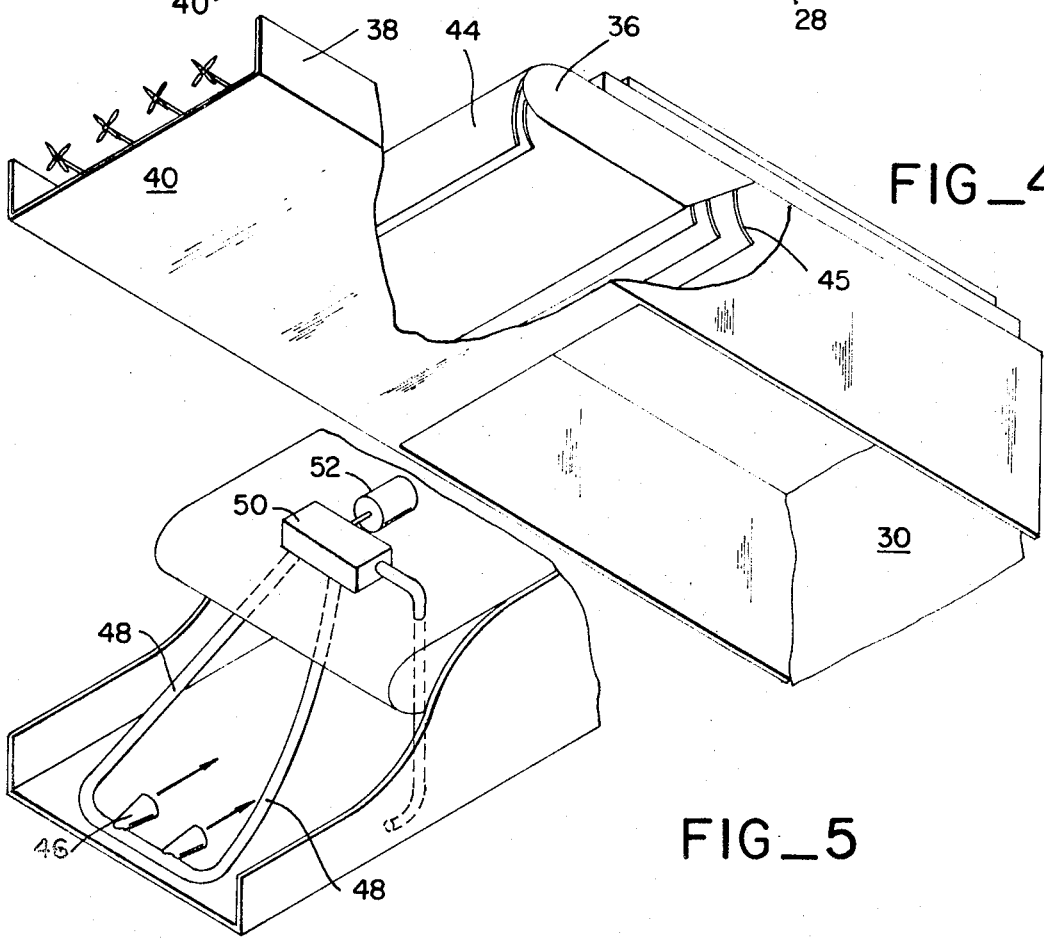
FIG_4
FIG_5
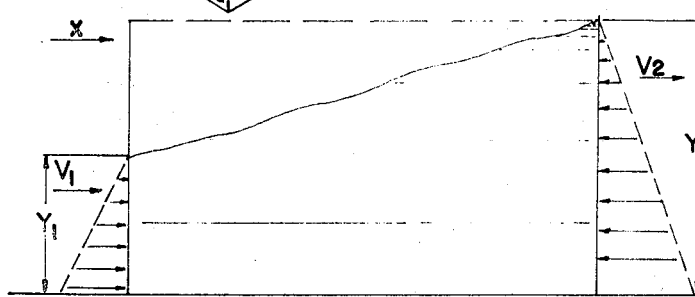
FIG_6
INVENTOR.
EDWARD A. BOYDSTON
BY Onay Wickersham & Erickson.
ATTORNEYS

HYDRAULIC JUMP CAPTURED AIR BUBBLE VESSEL

This application is a continuation-in-part of my application Ser. No. 870,301 filed Dec. 22nd, 1969 and now abandoned.

This invention relates to captured air bubble vessels or water vehicles also referred to as surface effect ships or air cushion vessels.

Such water vehicles or vessels operate on the principle of creating a body of air having an increased pressure underneath it which will support or cushion the main hull and superstructure of the vessel just above the water surface thereby vastly reducing or eliminating water friction and hull drag. One problem which arose with such vehicles was in maintaining the body of air beneath it so as to achieve and retain the necessary increased air pressure. Various forms of curtain or skin structures can be made to hold air in along the sides, but it was much more difficult to provide a barrier or seal for the trapped air cushion along the front of the vessel. The problem was particularly severe for vessels operating in relatively rough or choppy waters.

One object of my invention is to solve the aforesaid problem and provide an air cushion vessel that is more stable and reliable by creating and controlling a wave that will seal the front of the vehicle so that the air body or bubble beneath it can be captured. This allows the air to be trapped beneath the vessel and build up to a pressure level higher than ambient air pressure, thereby maintaining the force necessary to raise the vehicle or vessel up and keep it above the water level.

Another object of my invention is to provide an air cushion type water vessel that can operate with smoothness even in rough water by creating its own "hydraulic jump" wave using a forwardly located propulsion unit. The propulsion unit which may be propellers or underwater jets may be regulated to create a wave with a predetermined amount of energy and at a location that will provide the optimum of sealing effectiveness for all water surface conditions, while also propelling the vessel through the water.

Other objects and advantages of my invention will become apparent from the following detailed description presented with the accompanying drawings, in which:

FIG. 1 is a view in perspective showing a typical air cushion vessel of the prior art;

FIG. 2 is a view in perspective showing a vessel embodying the principles of the present invention;

FIG. 3 is a view in side elevation of the vessel in FIG 2;

FIG. 4 is a view in perspective of the vessel of FIGS. 2 and 3 taken from its underside with portions broken away;

FIG. 5 is a fragmentary view in perspective showing a modified form of my vessel utilizing underwater jets for thrust means; and FIG. 6 is a diagram illustrating the principles of the "hydraulic jump" as utilized in my invention.

With reference to the drawing, FIG. 1 illustrates schematically a captured air bubble vessel 10 of a type currently in limited use. Generally, this vessel has a channel-shaped hull 12 with rigid side walls 14 connected to a flexible skirt-like wall 16 at its bow and a similar flexible stern wall skirt that together form a cavity for the air bubble that cushions the vehicle on the water's surface. Driving power, indicated by the propellers 18 is at the stern. Vessels of this type have proven to be successful in limited applications such as on lakes and inland waters where the normal waves are usually very small. However, in even a moderate sea, the captured air bubble vessel of FIG. 1, becomes quite impractical due to normal wave action which buffets and batters the front wall 16. When subjected to the full variance of wave heights and troughs this front wall in rough sea conditions is rendered impractical and inefficient because the skirt not only is constantly battered, which slows the forward speed of the vessel, but air from the bubble cavity beneath the vessel can escape under its lower edge. This causes the loss of air cushion pressure and the main hull of the vessel thus lowers and contacts the water.

FIGS. 2-4 show a vessel 20 embodying the principles of my invention which produces a hydraulic jump wave to form a "front air seal" so that the vessel can operate free of ocean wave variances, and will not be buffeted and battered by large ocean waves. As shown, my vessel comprises generally a hull 22 with a main deck 24 that can support a suitable cabin or superstructure 26. Extending downwardly from the main deck are opposite sidewalls 28 that connect with a rear or stern wall flexible skirt 30 to form a central cavity 32 below the main deck. One or more fans 34 are positioned within the hull and driven by a suitable power plant to direct air downwardly within the cavity as in conventional air cushion vehicles. At the forward end of the cavity is a hull portion forming a curved bow 36 that extends between the sidewalls and has a flat underside that curves upwardly at both ends when viewed in a longitudinal vertical cross section. The sidewalls 28 extend forwardly from the bow 36 of the hull and they also taper downwardly in height toward their forward ends to form relatively narrow portions 38. These narrow portions are connected along their lower edges by a transverse portion 40 to form an open channel which is normally positioned well below the level of the bow portion 36 and below the nominal water level when the vessel is in normal operation. Mounted between the port and starboard forward end portions 38 is a thrust producing power means. In the embodiment of FIGS. 2-4, this power means comprises a series of motor driven propellers 42 that provide the forward thrust for the vehicle and also produce the "hydraulic jump" or wave (designated by the dotted line A in FIG. 3) that functions to seal the air cushion cavity. Any suitable power system, located within the hull or motors directly adjacent to the propellers can be used to drive them. In the arrangement shown, the propellers are preferably relatively small compared with the width of the channel and are spaced apart in a line extending between the narrow sidewall portions 38 forming the open channel. As a general rule, as established from actual tests, the maximum height of the hydraulic jump wave that can be produced is roughly five times the diameter of the propeller. On relatively large craft, a series of three to five propellers may be required to produce a sealing wave of adequate height across the full channel distance between the sidewalls 28. Immediately behind the propellers, the open channel extends rearwardly to the open cavity 32 underneath the main deck of the vessel 20 which commences just below the bow portion 36. At the curved underside on the forward end of the bow portion are attached one or more flexible skirt members 44 and similar skirt members 45 are attached on the trailing curved underside of the bow portion. These skirt members also help to maintain the air cushion under the hull at slower speeds when the jump wave must be lower.

When the vessel 20 is underway with the forward propellers turning, they not only provide the forward thrust for the vehicle but they also produce a "hydraulic jump" wave rearwardly that crests just under the bow portion 36.

As shown in FIG. 5, the thrust producing power means may comprise one or more underwater jet nozzles 46 instead of the propellers 42. Here, the nozzles are connected by conduits 48 to a pump 50 mounted on or within the vessel hull, which is driven by a suitable power means 52. Suction conduits which supply water to the pump may be supported by the sidewalls 28.

The principle of the "hydraulic jump" is well known in the field of fluid dynamics. For example, a full explanation may be found in the textbook, "Elementary Fluid Mechanics" by John K. Vennard, published by John Wiley & Sons, Inc. (1947). In this text, the relationship of the height of the jump wave produced, (the height of Y2 compared to Y1), and the relative velocities, (V1 to V2) are expressed in formulas that will form the basis for design of my vessel in different sizes. Using the known principles of the "hydraulic jump" the critical dimensions and specifications for the thrust power propellers 42 or the nozzles 46 and their location with respect to the curved bow portion 36 of the vessel and the flexible curtain or skirt 44 can be ascertained so that when the thrust producers are operating at their normal rate, the crest of the hydraulic jump wave will occur at just the right location, that is, right at the front curtain.

In operating my vehicle 20, the fan 34 or other means for producing and maintaining air bubble pressure is first energized. This commences the buildup of air pressure in the cavity or channel area 32 beneath the main deck of the vessel 26, the air therein being initially confined by the sidewalls 28, the stern wall curtain 30 and the flexible forward skirt members 44 and 45. Now, the forward thrust means such as the propellers 42 are turned on to move the vessel forwardly through the waters. As these propellers are brought up to speed, the hydraulic jump wave "A" is created just under the forward bow portion 36 and the skirt members 44. Even though the vessel may move into waters with larger or choppier waves, the hydraulic jump wave remains at its normal location at the bow portion of the vessel, providing a constant seal that prevents the escape of air from the cushioning bubble. Another advantage of the hydraulic jump wave is that its flow aft into the air bubble cavity tends to fill in or replace water that is displaced downward by the air bubble pressure on the surface of the water traveled over. This increases the efficiency and effectiveness of the air bubble pressure maintaining force which in turn makes the bubble more secure and reliable, with less tendency for air to leak out from under the vessel. As a consequence, my vessel which can be made in any size, can operate smoothly in almost any water despite the size of the surface waves. As illustrated in FIG. 3, the vessel, if made to proper size, will always produce a hydraulic jump wave that will be larger than surface waves encountered and thus will always be unaffected by such waves.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A water borne vessel of the type which is supported at least in part by a body of air, comprising:
a hull having a main deck with spaced apart sidewall members that extend below the water level and form a cavity under the main deck for retaining a supporting body of air with a forward opening between the side members;
means for supplying air to said cavity at a pressure which is higher than ambient air pressure;
means extending forwardly from said hull and forming a channel shaped inlet to said cavity;
and thrust means supported within said inlet for producing an underwater forward thrust to said vessel and simultaneously a hydraulic jump wave which will crest against the underside of said main deck of said hull so as to close said forward opening and prevent air from escaping from said cavity while the vessel is traveling through the water.
2. A water borne vessel which is described in claim 1 wherein said means extending forwardly are extended portions of said sidewall members which taper to a smaller height and are connected by a transverse portion to form an open channel, said thrust means being supported within said channel.
3. A water borne vessel which is described in claim 2 wherein said thrust means comprises a plurality of relatively small propellers arranged in a line extending transversely across said channel.
4. A water borne vessel which is described in claim 2 wherein said thrust means comprises one or more jet nozzles for expelling water below the nominal water level, and pump means for supplying a constant flow of water to said nozzles.
5. A water borne vessel which is described in claim 2 including flexible curtain means extending across said channel opening between said sidewall members.

* * * * *